Sept. 12, 1950 E. ACKERLIND ET AL 2,522,333

FUNCTION GENERATOR

Filed Oct. 30, 1948 2 Sheets-Sheet 1

INVENTOR.
ERIK ACKERLIND
CHARLES R. WILLIAMS

BY Herbert E. Metcalf
ATTORNEY

Sept. 12, 1950 E. ACKERLIND ET AL 2,522,333

FUNCTION GENERATOR

Filed Oct. 30, 1948 2 Sheets-Sheet 2

INVENTOR.
ERIK ACKERLIND
CHARLES R. WILLIAMS
BY
Herbert E. Metcalf
ATTORNEY

Patented Sept. 12, 1950 2,522,333

UNITED STATES PATENT OFFICE 2,522,333

FUNCTION GENERATOR

Erik Ackerlind, Santa Monica, and Charles R. Williams, Hawthorne, Calif., assignors to Northrop Aircraft, Inc., Hawthorne, Calif., a corporation of California Application October 30, 1948, Serial No. 57,532

10 Claims. (Cl. 235—61.6)

This invention relates to linear cam function generators, and more particularly to means and methods of preventing erroneous results when mechanically generating a function of an independent variable to obtain the dependent variable.

The function generator of this invention includes a means for sensing the position of signals on a linear cam, such as, for example, holes punched on a tape or card.

Ordinarily, sensing holes in a tape or card is accomplished by actually closing an electrical circuit through the hole by having a contact slide along the center line of the holes in the tape, slide into the hole in the tape when it passes, and make electrical contact with a plate on the other side of the tape. This method has several disadvantages that lead to erroneous readings: foreign matter preventing completion of the electrical circuit, such as an oil film or the like forming on one of the contacts; also, arcing through the tape or card at thin or low resistance spots and the like.

When a function is generated by moving a punched tape or card continuously in one direction, and sensing the holes by a feeler, the possibility of errors due to the tape stopping when the feeler is on the edge of a hole and then oscillating back and forth slightly to cause a sensing switch to open and close the circuit is always present, thereby giving an indication that the tape is moving when it is not.

It is, therefore, an object of this invention to provide a mechanical means and method whereby the numerical value of a mathematical expression in two variables can be positively and accurately generated.

Another object of this invention is to provide a novel means and method of accurately generating a function employing a continuous drive of the linear cam.

Another object of this invention is to provide a means and method of linear cam sensing which eliminates possible spurious readings resulting when a sensing device stops on the edge of a signal record and the linear cam oscillates slightly.

Another object is to provide a linear cam sensing system which eliminates the difficulties present when the linear cam contact area is contaminated.

Still another object is to provide a novel mechanical means for reversing the sense of the incremental change of the dependent variable.

Broadly stated, the present invention is comprised of a medium recorded with two rows of properly spaced discrete function signals. The length of the medium traversed corresponds to the independent variable and the number of discrete signals recorded in that length corresponds to the dependent variable. The medium recording is continuously driven past scanning heads associated with each of the two rows of discrete function signals. These scanning heads are adapted to alternately sense the discrete signals recorded thereon and to convey the resulting electrical effect to actuate means for rotating an output shaft in one direction or the other in accordance with a switching device controlled by a third row of discrete signals recorded on the medium.

This invention possesses numerous other objects and features, some of which, together with the foregoing, will be set forth in the following description of a preferred embodiment of the invention.

Figure 1:
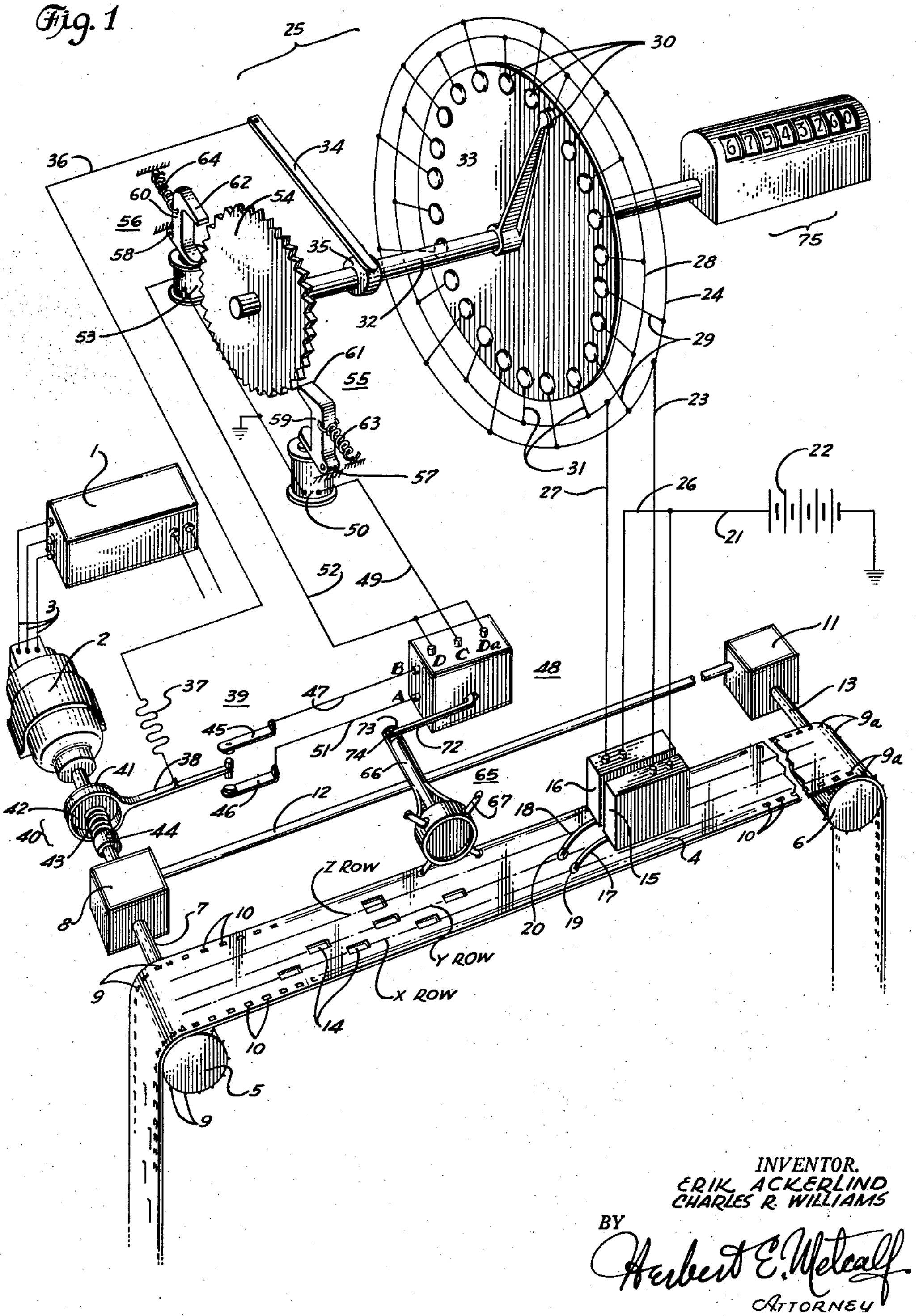
Figure 1 is a schematic diagram in perspective illustrating one embodiment of the present invention.

Referring first to Figure 1, an actuator 1 representing an independent variable, energizes a sprocket arm motor 2 through leads 3 to control the movement of a tape cam 4 over the span formed by front and rear sprockets 5 and 6, respectively. Conventional take up reels (not shown) are provided. Motor 2 rotates a front sprocket shaft 7 through a front gear box 8. A front sprocket 5 rotated by front sprocket shaft 7 has a row of teeth 9 disposed around the circumference thereof at each end to mesh with sprocket holes 10 in a tape cam 4. Front gear box 8 also has a right angle drive which is rotatably connected to an associated rear gear box 11 by means of link shaft 12. This latter shaft is parallel to the longitudinal span of the tape and affords a positive drive for the rear sprocket 6 by driving a rear sprocket shaft 13 from a right angle drive in rear gear box 11. Rear sprocket 6 has teeth 9a thereon, similar to those of the front sprocket 5, also meshing with sprocket holes 10 of tape cam 4.

Tape cam 4, which is in this case standard 35 mm. movie film, for example, is of a uniform thickness and is punched with two rows of information or function holes 14. As the edges of these holes are used to provide a camming action for a follower (later described) this particular embodiment may conveniently be termed a tape cam, and when the tape is progressed at a constant rate it can be properly designated a linear cam. The center lines of the rows run lengthwise and parallel to the edge of the tape cam. The holes are placed alternately in the rows on the tape cam at predetermined intervals depending on the information they are used to represent. For ease of reference in the ensuing discussion, the outside row of information holes, as viewed from the right in the drawing, will be called the X row and the adjacent row of information holes will be called the Y row.

Disposed approximately in the middle of the span of the tape cam and supported slightly above the tape are two sensitive snap switches 15 and 16. Several makes of satisfactory switches are available in the market. The followers 17, 18, respectively, of these switches are pressed against the tape and are so positioned that, as the tape is progressed past the followers 17 and 18, the latter pass over the center lines of the information holes or row X and row Y, respectively. Followers 17 and 18 have rollers 19 and 20 pinned at their extremities which provide for rolling contact with the tape cam. Followers 17 and 18 are provided with stops inside switches 15 and 16 preventing the rollers 19 and 20 from dropping downwardly a distance appreciably greater than the thickness of the tape cam 4.

Whenever a hole in row X of the tape cam passes its associated switch follower 17, the follower drops a distance at least equal to the thickness of the film and actuates the cooperating sensitive snap switch 15 to close a circuit connecting a power lead 21, from a power source 22, to relay lead 23 joined to an outer circumferential lead 24 of a step relay switch 25. The actuation of the other sensitive snap switch 16 by the cooperating follower 18 dropping into a hole in row Y closes a circuit connecting a second power lead 26, from the same power source 22, to a second relay lead 27 joined to an inner circumferential lead 28 of step relay switch 25.

The outer circumferential lead 24 has a plurality of radial leads 29 conecting to every other terminal of a circular arrangement of a plurality of stationary contacts 30 on step relay switch 25. The inner circumferential lead connects to the remaining terminals of the contacts 30 by a second plurality of radial leads 31. The shaft 32 of step relay switch 25 is disposed perpendicular to this circular arrangement of stationary contacts 30, passing through the center thereof. A relay switch arm 33 is rigidly secured to the step relay switch shaft 32 and is disposed in the plane of the circular contacts. The outer extremity of relay switch arm 33, rotating with the step relay switch shaft 32, makes contact with successive terminals of the circular arrangement of contacts. Thus, relay switch arm 33, in conjunction with the actuation of either row X or row Y sensitive snap switch, will conduct electrical energy to the current carrying portion of the step relay switch shaft 32. This energy is conducted away from the step relay switch shaft by a brush 34 riding on an annular ring 35 secured to the step relay switch shaft. A direction switch lead 36 connects brush 34 by means of a flexible portion 37 to an intermediate point of a movable arm 38 of a direction switch 39. This movable arm 38 tends to rotate with the front sprocket shaft 7 by means of a friction clutch 40 whose elements are concentrically disposed about the front sprocket shaft 7. The driven friction disc member 41 of the clutch, which has the movable arm 38 of the direction switch rigidly attached thereto, is mounted on but not secured to the front sprocket shaft 7. A driver friction disc 42 has one face yieldingly urged against the face of the driven disc 41 by means of a compression spring 43, the driver disc being rotating by but free to move axially along the front sprocket shaft. One extremeity of the compression spring 43 is pressed against the driven disc 41 and the other extremity is anchored to a collar 44 keyed or otherwise securely attached to the front sprocket shaft 7.

The contact end of movable arm 38 is thus noted to be activated, in response to the sense of rotation of the actuator motor, to touch either an upper terminal 45 or a lower terminal 46 of the direction switch 39. Upper switch lead 47 connects the upper terminal of the direction switch 39 with terminal B of the two-pole microswitch 48. Terminal B is normally interconected to terminal C. Right solenoid lead 49 connects terminal C to the right-hand solenoid 50 of step relay switch 25. This right-hand solenoid 50 is designated as the add solenoid. In a similar manner, lower switch lead 51 connects the lower terminal 46 of the direction switch with terminal A of the two-pole microswitch 48. Normally, terminal A is interconnected to terminal D of the microswitch 48. Left solenoid lead 52 connects terminal D with the left-hand solenoid 53 of step relay switch 25, designated as the subtract solenoid. Add and subtract solenoids are both grounded, thereby completing the circuit to the power source 22 which is likewise grounded.

The extension of step relay switch shaft 32 beyond annular ring 35 has a stepping gear 54 attached to the end thereof. Diametrically disposed on either side of the stepping gear 54 are pawls 55 and 56. The right-hand pawl 55 is designated the add pawl since it is disposed above and actuated by the hereinbefore described add solenoid 50. Likewise, the left-hand pawl 56 is referred to as the subtract pawl since it is disposed above and actuated by the subtract solenoid 53. The add and subtract pawls, pivoted about axes 57 and 58, respectively, are comprised of arms 59, 60 and fingers 61, 62, respectively. When the relay circuit of the system is open both the add and subtract pawl are held in a disengaged position away from the teeth of stepping gear 54 by means of springs 63 and 64, respectively. However, when the add solenoid becomes energized it pulls the add pawl in a downwardly direction angularly about pivot 57. This action causes the add pawl to engage a tooth on stepping gear 54 and to rotate the stepping gear clockwise so that the contact end of relay switch arm 33, rigidly linked to rotate with the stepping gear, will revolve clockwise to the next succeeding contact of the circular arrangement of contacts. In a like manner, if subtract solenoid 53 becomes activated, it pulls subtract pawl 56 angularly about its axis 58, engaging a tooth of stepping gear 54, resulting in stepping gear 54 rotating to turn relay switch arm 33 to the next contact in a counterclockwise direction.

Figure 2:
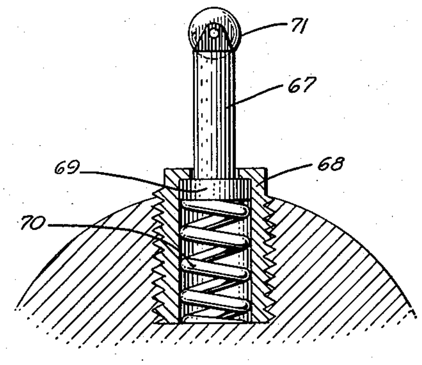
Figure 2 is a detail sketch of a portion of the reversing switch.

A reversing device 65 is utilized to communicate between a third row Z of holes punched on the left of the tape cam 4 and the two-pole microswitch 48 of the just above-described stepping circuit. The body 66 of this reversing device 65 is disposed above the span of the tape cam 4 with its longitudinal axis parallel to the plane of the tape and perpendicular to its lengthwise span. Near the right end of this reversing device body, and on the circumference thereof, four radial arms 67 are disposed at 90° intervals. Referring to Figure 2, each radial arm 67 is held in the reversing device body 66 by a hollow set screw 68. The head 69 of radial arm 67 is seated against the inside shoulder of the hollow set screw 68 by means of a radial arm compression spring 70. Radial arm rollers 71 pinned to the ends of the radial arms provide for rolling contact with the tape cam. The reversing device 65 rests on the tape cam on the center line of the Z row of holes by means of two of its radial arms touching the tape cam. The radial arms so disposed that they are at 45° to the plane of the tape cam. These radial arms are lightly forced into their sockets by the tape cam when in this position. Whenever one of the tape contacting radial arms 67 has a hole in the tape fed past it, the roller 71 thereof becomes free to drop into the hole by the action of radial arm compression spring 70. The tape thus rotates the radial arm a quarter turn about the longitudinal axis of the reversing device body 66. Reversing device follower 72 of the two-pole microswitch 48 rests on the left end of this reversing device body. Flats 73 and 74 are filed on opposite sides of the left end of this reversing device body and in a plane at 45° to two of the radial arms. As the reversing device rotates 90°, due to the engagement of one of the radial arms with a hole in the tape, the follower 72 of the two-pole microswitch is actuated by rising from the level of the flat to the full radius of the reversing device body 66. This action interconnects terminal A of the two-pole microswitch, to terminal C and interconnects terminal B to terminal D*a*, which is permanently interconnected to terminal D, resulting in the normally designated subtract solenoid to become the add solenoid, and the normally designated add solenoid to become the subtract solenoid.

Figure 3:
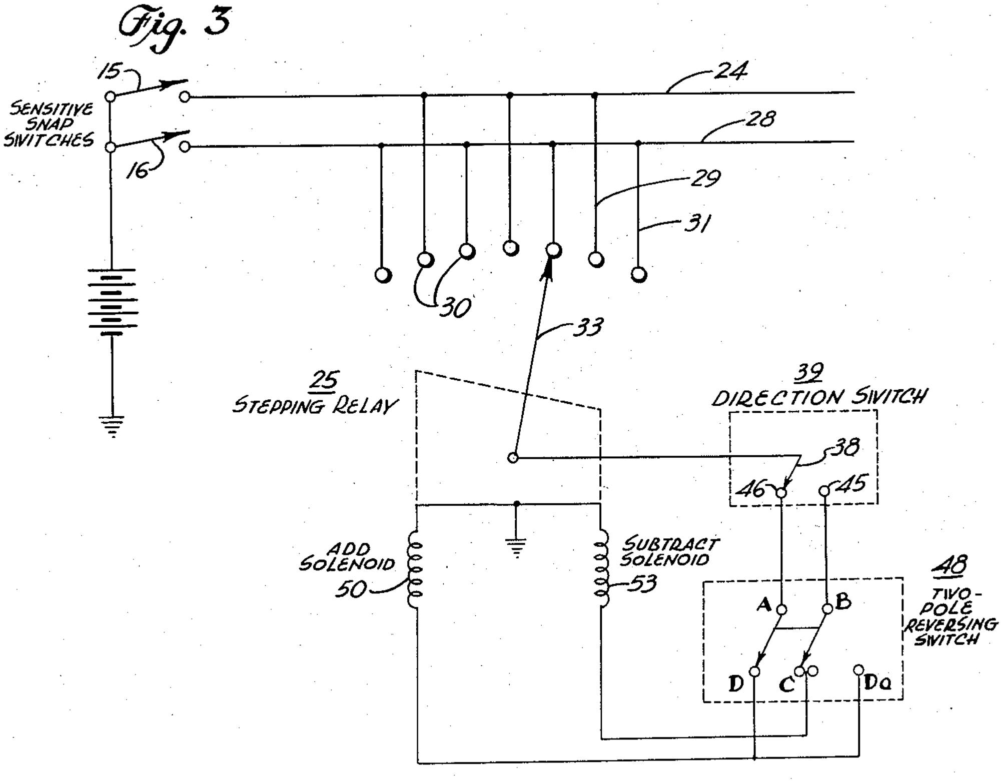
Figure 3 is a view illustrating the control circuit.

The incremental generation of a mathematical expression in two variables can be generated by the described tape cam and the accompanying sensing device or circuit. In generating the sine function up to 360°, for example, as in the embodiment of the present invention, the tape is punched with holes representing a sine function, in rows X and Y. The tape cam is set into motion by energizing the sprocket arm motor 2 by the independent variable actuator 1. When a hole in the tape, for example a hole in row X, passes under the follower of its associated sensitive snap switch 15, the relay circuit of Figure 3 is closed and either the add or subtract solenoid of the stepping relay switch is actuated to cause the relay switch arm 33 to rotate a fixed amount, representing the uniform incremental change of the dependent variable, to the next contact of the circular arrangement of stationary contacts 30. This next contact places the sensitive snap switch 16, located to ride over the center line of the holes in row Y, into the circuit. When a hole in row Y passes under the switch follower of sensitive snap switch 16 the relay circuit is again closed and the stepping relay switch is activated to again rotate the relay switch arm 33 a uniform increment to the next contact of the circular arrangement of stationary contact, thereby placing the sensitive snap switch associated with row X back into the relay circuit. Thus, the amount of rotation of the shaft of the stepping relay switch is a measure of the total number of holes, in both rows X and Y of the tape cam, passing under the associated followers. In the embodiment of the present invention, this amount of rotation of the stepping relay shaft, representing the dependent variable output, is recorded on mechanical counter 75.

When generating a sine function, starting at 0°, the shaft of the stepping relay switch, activated by the add solenoid, revolves an amount corresponding to the sine of the angle. When the angle passes through 90°, going from the first quadrant to the second, a hole in the third row Z of the tape actuates the reversing switch device 65, which in turn actuates the follower of reversing switch 48, so that the opposite solenoid, the subtract solenoid, is actuated and an increase in the size of the angle causes a decrease in the value of the output, i. e., the stepping relay switch shaft rotates in the opposite direction. A similar but vice versa reversal takes place at 270°.

If the magnitude of the angle decreases, the actuator 1 rotates motor 2 and front sprocket shaft 7 clockwise to drive the tape cam in the opposite direction, i. e., backward. The friction clutch 40 on front sprocket shaft 7 thus yieldingly urges the movable arm 38 to bear against the opposite, i. e., the upper terminal 45 of direction switch 39. This causes the subtract solenoid to be actuated for the first and fourth quadrant angles and the add solenoid to be actuated for the second and third quadrant angles.

In accordance with the principle of the apparatus for generating any mathematical expression, the length of the tape traversed through the sensing device corresponds to the independent variable and the number of holes sensed in this length corresponds to the dependent variable. When the value of the dependent variable or the function is changing rapidly the holes punched in the tape are closely spaced and when the function is changing slowly the holes are spaced farther apart. The holes in the tape need be only large enough to ensure that the follower will actuate the switch at the speed the tape is driven. In calculating the position in which to punch the holes in the tape, they can be considered to be in one row; then the distance between holes would be determined by the amount the function changes at that position along the tape; then alternate holes would be offset to make the two rows.

As a broad generalization, the purpose of the direction switch 39 actuated by the friction clutch off the front sprocket shaft is to sense whether the magnitude of the independent variable or the input is increasing or decreasing while generating the mathematical expression. Likewise, the purpose of the reversing device 65, controlled by the third row of holes Z in the tape cam, is to sense if the magnitude of the dependent variable or the output should be increasing or decreasing as the mathematical expression is generated.

The invention accomplishes the object of positively generating a function by utilizing two rows of holes in the tape and alternately switching from one to the other. Thus, the possibility of a spurious reading caused by forward and backward movements of the tape while one of the followers is passing over a hole in the tape is completely eliminated; since, any time a sensitive snap switch is closed in X row of holes, the step relay switches to the next contact and will not close again until the sensitive snap switch of the Y row of holes has been closed.

The advantage of utilizing sensitive snap switches, as in the embodiment of this invention, is that the contacts of the switches are enclosed, thereby eliminating the difficulties encountered by open switch contacts which may become contaminated; likewise, arcing through thin resistance areas in the tape is non-existent.

To eliminate wear due to the sliding of the radial arms of the reversing device and the followers of the sensitive snap switches bearing against the moving tape, rollers are pinned onto the extremities of the radial arms and followers, as shown in Figure 2, to provide rolling contact with the moving tape.

When using a tape recorded medium method of generating a function the dependent variable is not generated continuously but by discrete steps of equal magnitude. The smaller the magnitude of the step, the greater the accuracy of the function generated. In order to keep the length of the tape used to a minimum, the accuracy of generating the function is held only to the degree required. The scanning of each information hole changes the magnitude of the function by the amount of the step. Thus, for generating the sine of an angle, the following table gives the tape length per maximum error for an assumed minimum hole spacing of one-tenth of an inch. This minimum hole spacing occurs at that point on the tape where the change of the dependent variable is most rapid.

| Length per 90° | Maximum error of sine |
|---|---|
| *Feet* | |
| 2,680 | ±0.5×10−5 |
| 536 | ±2.5×10−5 |
| 268 | ±5.0×10−5 |
| 44.7 | ±30.0×10−5 |

This invention is a valuable aid to a computing system. The amount of tape fed through the sensing device can, for example, be controlled by the output of a computer. The output of the shaft of the stepping relay switch will in this case be the dependent variable: this can be fed into another computer for further use; connected to a counter to count the number of revolutions; geared to a pointer on a dial; fed to some distant point through a servo mechanism; or the like.

It will now be clear to those skilled in the art that the use of a double track with successive signals alternating on one then the other could be used with other types of recorded medium than holes in a tape to accomplish the purpose of this invention. For example: a flexible steel tape with magnetic signals recorded thereon; embossed cellophane; holes in a tape interrupting the beam of a linear light source focused onto a photocell; or even recorded drums might be employed.

There is thus provided novel mechanical means and methods whereby a function can be generated to any predetermined accuracy without giving spurious readings.

What is claimed is:

1. A function generator comprising a linear record medium; a first and second row of signal generating records on said medium representing a function, each successive signal record on said medium occurring on alternate rows; means for progressing said medium in accordance with an independent variable; means associated with each of said rows for generating an output signal resulting from the movement of said record past thereof; an output shaft; means for rotating said output shaft; circuit means for conveying said output signals to said latter means for rotating said output shaft in uniform increments in accordance with said output signals; means whereby each incremental rotation of said output shaft, caused by an output signal from one of the two said generating means, switches the other of said generating means into said circuit.

2. A function generator comprising a linear record medium; a first and second row of signal generating records on said medium representing a function, each successive signal on said medium occurring on alternate of said rows; a third row of signal records on said medium representing switching signals; an independent variable actuator; means for progressing said medium in accordance with said independent variable actuator; means associated with each of said first and second rows for generating an output signal resulting from the movement of said record past thereof; an output shaft; a first means for rotating said output shaft clockwise; a second means for rotating said output shaft counterclockwise; circuit means for conveying said output signals to actuate one or the other of said shaft rotating means, said output shaft being rotated in uniform increments in accordance with said output signals; means whereby each incremental rotation of said output shaft, caused by an output signal from one of the two said generating means, switches the other of said generating means into said circuit; switching means in said circuit actuated by said third row of signal records for causing said output signal to actuate the opposite rotating means of said output shaft, thus reversing the direction of incremental rotation of said output shaft.

3. A function generator comprising a linear record medium; a first and second row of signal generating records on said medium representing a function, each successive signal record on said medium occurring on alternate of said rows; an independent variable actuator controlling a motor; means for continuously progressing said medium in accordance with said motor; means associated with each of said rows for generating an output signal resulting from the movement of said record past thereof; an output shaft; a first means for rotating said output shaft clockwise; second means for rotating said output shaft counterclockwise; circuit means for conveying said output signals to actuate one or the other of said shaft rotating means, said output shaft being rotated in uniform increments in accordance with said output signals; means whereby each incremental movement of said output shaft, caused by an output signal from one of the two said generating means, switches the other of said generating means into said circuit; switching means in said circuit actuated in accordance with the sense of rotation of said motor causing said output signal to actuate either one or the other said rotating means of said output shaft.

4. A function generator comprising a linear record medium; a first and second row of signal generating records on said medium representing a function, each successive signal on said medium occurring on alternate of said rows; a third row of signal records on said medium representing switching signals; an independent variable actuator controlling a motor; means for continuously progressing said medium in accordance with said motor; means associated with each of said first and second rows for generating an output signal resulting from the movement of said record past thereof; an output shaft; a first means for rotating said output shaft clockwise; a second means for rotating said output shaft counterclockwise; circuit means for conveying said output signals to actuate one or the other of said shaft rotating means, said output shaft being rotated in uniform increments in accordance with said output signals; means whereby each incremental movement of said output shaft, caused by an output signal from one of the two said generating means, switches the other of said generating means into said circuit; a first switching means in said circuit actuated by said third row of signal records for causing said output signals to actuate either one or the other rotating means of said output shaft; a second switching means in said circuit actuated in accordance with the sense of rotation of said motor causing said output signal to actuate either one or the other rotating means of said output shaft.

5. A function generator comprising a linear record medium; a first and second row of signal generating records on said medium representing a function, each successive signal on said medium occurring on alternate of said rows; an independent variable actuator controlling a motor; means for continuously progressing said medium in accordance with said motor; means associated with each of said rows for generating an output signal resulting from the movement of said record past thereof; an output shaft; a means for rotating said output shaft; circuit means for conveying said output signals to actuate said means for rotating said output shaft in uniform increments in accordance with said output signals; a plurality of stationary contacts equally spaced in a circular arrangement, the angular spacing of each of said contacts made equal to the incremental rotation of said output shaft; an arm on said output shaft disposed to pass over said stationary contacts when said output shaft is rotated; alternate of said stationary contacts connected to the same one of the two said generating means; each incremental movement of said output shaft rotating said arm to place the alternate of said generating means into said circuit.

6. A function generator comprising a tape cam; two drive sprockets, said tape cam spanning said drive sprockets; a first and second row of information holes on said cam representing a function, each successive hole on said cam occurring on alternate of said rows; a third row of holes on said cam representing switching signals; a motor coupled to positively drive said drive sprockets; an independent variable actuator controlling the rotation of said motor; a first sensitive snap switch disposed to ride over the first row of information holes; a second sensitive snap switch disposed to ride over the second row of information holes; circuits connecting each of said sensitive snap switches from a common power source to alternate contacts of a circular arrangement of a plurality of stationary contacts; an output shaft placed normal to the plane of and passing through the center of said circular arrangement of contacts; an arm on said output shaft disposed to pass over said stationary contacts when said output shaft is rotated; a stepping gear attached to one end of said output shaft; an annular ring and brush contact made with the current carrying portion of said output shaft; solenoid and pawl drives disposed on either side of said stepping gear so as to rotate said output shaft in one direction or the other; a first and second switching means; a circuit connecting said brush through said first and second switching means to one or the other of said solenoid and pawl drives, the solenoid and pawl drive actuated depending on both said first and second switching means; said first switching means in said circuit comprised of a movable rod actuated by a friction clutch member driven off the coupling drive of and in accordance with the sense of rotation of said motor; said second switching means comprised of a switching device actuated by said third row of holes in said cam, said switching device in turn actuating a two-pole microswitch in said circuit.

7. A function generator comprising a tape cam; two drive sprockets; said tape cam spanning said drive sprockets; a first and second row of information holes on said cam representing a sine function to 360°, each successive hole on said cam occurring on alternate of said rows; a third row of holes on said cam occurring at 90 and 270° representing switching signals; a motor coupled to positively drive said drive sprockets; an independent variable actuator controlling the rotation of said motor; a first sensitive snap switch disposed to ride over the first row of information holes; a second sensitive snap switch disposed to ride over the second row of information holes; circuits connecting each of said sensitive snap switches from a common power source to alternate contacts of a circular arrangement of a plurality of stationary contacts; an output shaft placed normal to the plane of and passing through the center of said circular arrangement of contacts; an arm on said output shaft disposed to pass over said stationary contacts when said output shaft is rotated; a stepping gear attached to one end of said output shaft; an annular ring and brush contact made with the current carrying portion of said output shaft; solenoid and pawl drives disposed on either side of said stepping gear so as to rotate said output shaft in one direction or the other; a first and second switching means, a circuit connecting said brush through said first and second switching means to one or the other of said solenoid and pawl drives, the solenoid and pawl drive actuated depending on both said first and second switching means; said first switching means in said circuit comprised of a movable rod actuated by a friction clutch member driven off the coupling drive of and in accordance with the sense of rotation of said motor, the rotation of said motor indicating whether the independent variable angle is increasing or decreasing; said second switching means comprised of a switching device actuated by said third row of holes; said switching device in turn actuating a two-pole microswitch in said circuit; the switching of said second switching means indicating a change in sense of the dependent variable incremental output representing the sine.

8. Apparatus in accordance with claim 7 wherein rolling contact is provided for said sensitive snap switches and said switching device when riding over the row of holes in said tape cam.

9. A function generator comprising a record medium; a first and second row of signal generating records on said medium representing a function, each successive signal record on said medium occurring on alternate rows; means for progressing said medium in accordance with an independent variable; means associated with each of said rows for generating an output signal resulting from the movement of said record past thereof; increment registering means; circuit means for conveying said output signals to operate said latter means for registering increments thereby in accordance with said output signals; and means whereby each incremental registry performed by said incremental registering means, caused by an output signal from one of the two said generating means, switches the other of said generating means into said circuit.

10. A function generator comprising a tape; a first and second row of information holes on said tape representing a function, each successive hole on said tape occurring on alternate rows; means for progressing said tape in accordance with an independent variable; means associated with each of said rows for generating an output signal resulting from the movement of said holes past said latter means; an output shaft; means for rotating said output shaft; circuit means for conveying said output signals to said latter means for rotating said output shaft in uniform increments in accordance with said output signals; means whereby each incremental rotation of said output shaft, caused by an output signal from one of the two said generating means, switches the other of said generating means into said circuit.

ERIK ACKERLIND.
CHARLES R. WILLIAMS.

REFERENCES CITED

The following references are of record in the file of this patent:

UNITED STATES PATENTS

| Number | Name | Date |
|---|---|---|
| 265,358 | Anderson | Oct. 3, 1882 |
| 285,710 | Van Hoevenbergh | Sept. 25, 1883 |
| 1,764,340 | Oman | June 17, 1930 |
| 2,073,246 | Merrick | Mar. 9, 1937 |